United States Patent
Wirth et al.

(10) Patent No.: US 8,752,886 B2
(45) Date of Patent: Jun. 17, 2014

(54) MOUNTING MODULE FOR A COOLING AIR FLAP MODULE IN A FRONT PANEL OF A MOTOR VEHICLE

(75) Inventors: Christian Wirth, Stuttgart (DE);
Manfred Würfel, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 1098 days.

(21) Appl. No.: 12/760,589

(22) Filed: Apr. 15, 2010

(65) Prior Publication Data

US 2010/0282438 A1    Nov. 11, 2010

(30) Foreign Application Priority Data

May 7, 2009  (DE) .......................... 10 2009 020 352

(51) Int. Cl.
    *B60K 11/04*    (2006.01)
(52) U.S. Cl.
    USPC .................................... 296/193.09; 180/68.6
(58) Field of Classification Search
    USPC ................... 296/193.1, 193.09, 180/.5, 180.1;
                    293/115; 180/68.1; 454/152, 162–165
    See application file for complete search history.

(56) References Cited

U.S. PATENT DOCUMENTS

| | | | |
|---|---|---|---|
| 4,410,032 A | | 10/1983 | Mori |
| 5,732,666 A | * | 3/1998 | Lee ............................ 123/41.05 |
| 6,902,474 B2 | * | 6/2005 | Gehring et al. ............... 454/153 |
| 7,766,111 B2 | * | 8/2010 | Guilfoyle et al. ............ 180/68.1 |
| 2006/0073781 A1 | * | 4/2006 | Mochizuki et al. .......... 454/152 |
| 2009/0050385 A1 | * | 2/2009 | Guilfoyle et al. ............ 180/68.1 |
| 2009/0058141 A1 | * | 3/2009 | Hirukawa .................. 296/193.1 |
| 2010/0243351 A1 | * | 9/2010 | Sakai ........................... 180/68.1 |
| 2010/0243352 A1 | * | 9/2010 | Watanabe et al. ........... 180/68.1 |
| 2011/0005851 A1 | * | 1/2011 | Doroghazi et al. .......... 180/68.1 |
| 2012/0097464 A1 | * | 4/2012 | Waugh ........................ 180/68.1 |

FOREIGN PATENT DOCUMENTS

| | | |
|---|---|---|
| DE | 3605064 A1 | 8/1987 |
| DE | 10306058 A1 | 8/2004 |
| DE | 10306158 A1 | 8/2004 |
| EP | 1522448 A1 | 4/2005 |
| JP | 58139327 | 9/1983 |
| JP | 58139519 | 9/1983 |
| JP | 2003035224 | 2/2003 |
| JP | 2007001503 | 1/2007 |
| JP | 2007001503 A | 1/2007 |

* cited by examiner

*Primary Examiner* — Glenn Dayoan
*Assistant Examiner* — Pinel Romain
(74) *Attorney, Agent, or Firm* — Gerald E. Hespos; Michael J. Porco; Matthew T. Hespos (57) ABSTRACT

The cooling air flap module has a closed mounting frame with bearings and an actuating device for the cooling air flaps, and the mounting frame of the module is arranged so as to be fixed in a forward-mounted reinforcing frame. The mounting frame with the reinforcing frame can be connected as a constructional unit to the front panel so as to form a construction module.

13 Claims, 10 Drawing Sheets

MOUNTING MODULE FOR A COOLING AIR FLAP MODULE IN A FRONT PANEL OF A MOTOR VEHICLE

CROSS-REFERENCE TO RELATED APPLICATION

This application claims the priority, under 35 U.S.C. §119, of German application DE 10 2009 020 352.4, filed May 7, 2009; the prior application is herewith incorporated by reference in its entirety.

BACKGROUND OF THE INVENTION

Field of the Invention

The invention relates to a mounting module for a cooling air flap module in a front panel of a motor vehicle, which in each case faces an air feed opening in the front panel. The cooling air flaps of the cooling air flap module are arranged in a frame element and can be actuated by at least one actuating element of an actuating device.

Published, non-prosecuted German patent application DE 103 06 058 A1 discloses a device for adjusting an air flow to an engine compartment of a motor vehicle which, in the installed position, is arranged in a region situated between an externally visible decorative grille and a cooling water heat exchanger. The device contains pivoted flaps, which are arranged in a frame structure and are supported pivotably in the frame structure by pivots. The pivoted flaps can be actuated by a transmission device, which is connected to an actuating drive device.

SUMMARY OF THE INVENTION

It is accordingly an object of the invention to provide a mounting module for a cooling air flap module in a front panel of a motor vehicle which overcomes the above-mentioned disadvantages of the prior art devices of this general type, which is of compact construction and, together with the front panel and a frame structure, forms a preassembled module which is distinguished by an optimum air supply.

With the foregoing and other objects in view there is provided, in accordance with the invention a mounting module for a front panel of a motor vehicle and the front panel has an air feed opening. The mounting module contains a forward-mounted reinforcing frame and a cooling air flap module having a closed mounting frame, cooling air flaps disposed in the closed mounting frame, and an actuating device having actuating elements for actuating the cooling air flaps. The closed mounting frame has bearings and is fixed in the forward-mounted reinforcing frame. The closed mounting frame with the forward-mounted reinforcing frame are connected as a constructional unit to the front panel so as to form a module.

The principal advantages achieved by the invention consist in that a preassembled module containing a ready-to-use cooling air flap module, a reinforcing frame and a front panel is formed, and, according to the invention, provision is advantageously made for the cooling air flap module to contain a closed mounting frame with bearings and an actuating device for the cooling air flaps, and for the mounting frame of the module to be arranged so as to be fixed in a forward-mounted reinforcing frame. The mounting frame with the reinforcing frame are capable of being connected as a constructional unit to the front panel so as to form a module.

The front panel has two lateral air inlet openings situated at the outside, which are each adjoined on the inside by the reinforcing frame with integrated mounting frame of the cooling air flap module. The mounting frame is placed on the reinforcing frame from the rear with respect to the direction of driving, and is preferably connected at the top, at the bottom and at the sides by a plurality of screwed joints, the reinforcing frame preferably being capable of being fixed on the front panel by screwed and/or snap-in joints. This embodiment of the reinforcing frame and of the mounting frame for the cooling air flap module and of the fastening between the frame and the front panel provides a compact and robust module unit which is simple to preassemble and can be connected to the front panel of the motor vehicle to form a constructional unit.

To allow pivotable mounting of the cooling air flaps in the mounting frame, the frame has in the center of the frame a vertical support with bearings embodied as holes or the like and, on lateral edge webs of the frame, has further mutually corresponding bearing holes for holding bearing journals of the individual cooling air flaps. In a preferred embodiment, the bearing journals are, in particular, arranged in a horizontal longitudinal center plane of each cooling air flap, and the bearing journals can be inserted into the respective bearing holes in the mounting frame. According to a further version of the embodiment, it is also possible for the bearing journals to be arranged at the upper edge of the cooling air flaps.

The bearing holes in the mounting frame are preferably arranged in projecting lugs. According to a further embodiment of the invention, arrangement of the bearing holes in the side walls of the mounting frame is also possible.

In an open position for allowing the air to flow through, the cooling air flaps of the module are arranged as in-line extensions of laminar transverse ribs arranged in a fixed manner on the forward-mounted reinforcing frame. By the extension of the guidance of the air by the laminar transverse ribs, targeted guidance of the air to the vehicle radiator from the outside inwards is achieved, with the result also that the aerodynamic potential is exploited in a highly effective manner.

The mounting frame of the cooling air flap module has at one edge a side wall offset at a right angle, on the inside of which the actuating elements of the actuating device for actuating the cooling air flaps are arranged and supported and on the outside of which an actuating motor is held in a motor mounting.

In particular, according to the invention the actuating device contains actuating elements, which are each connected to each outer bearing journal on one side of the cooling air flaps and act as levers and are pivoted on a common connecting lever by snap-in studs, and the connecting lever, interacting with a drive lever, can be driven by the actuating motor. By virtue of the arrangement of the actuating motor at the outside, which is snapped into a motor mounting riveted to the side wall, exchange, for purposes of repair for example, is a simple matter.

Those bearing journals of the cooling air flaps which face the actuating element of the actuating device each have at their end a square profile which can be inserted into a corresponding square profile of the actuating element of each cooling air flap. The bearing journals are secured by retaining clips that are placed on. The construction of the actuating device with the mounted bearing journals of the cooling air flaps makes assembly and disassembly simple. Moreover, the mounting frame, as the central element, carries all the components of the cooling air flap module and can thus be exchanged as a whole in a simple manner.

The connecting lever is arranged in approximately vertical alignment and is connected to the actuating elements of the cooling air flaps, the flaps being movable synchronously into an open position, a closed position and an intermediate position.

In particular, optimum air flow control according to the driving situation is achieved through the possibility of selectively setting intermediate positions of the cooling air flaps.

Other features which are considered as characteristic for the invention are set forth in the appended claims.

Although the invention is illustrated and described herein as embodied in a mounting device for a cooling air flap module in a front panel of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
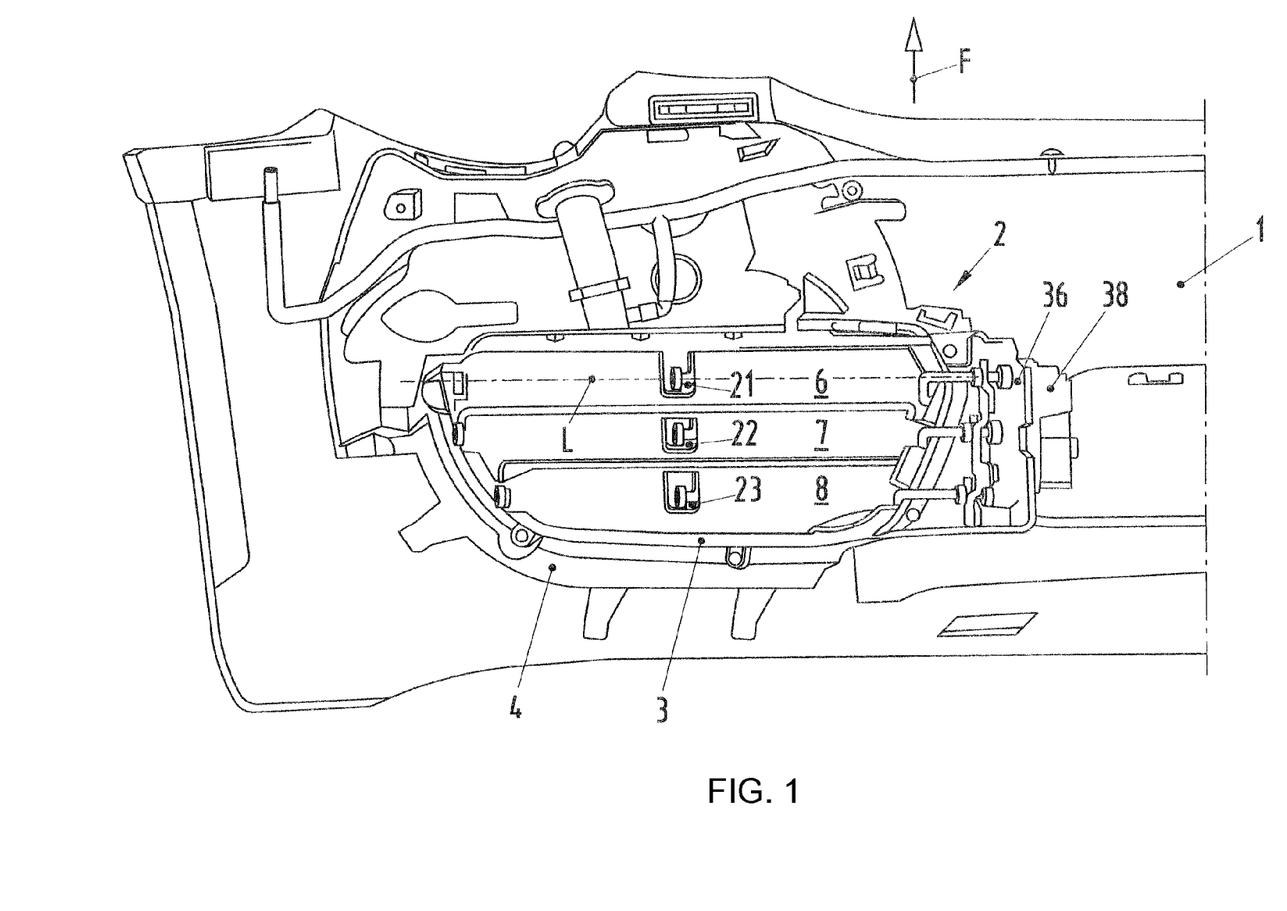
FIG. 1 is a diagrammatic, elevational view of a mounting device for a cooling air flap module with a mounting frame, a reinforcing frame and a front panel from the inside with respect to a direction of driving according to the invention.
Figure 2:
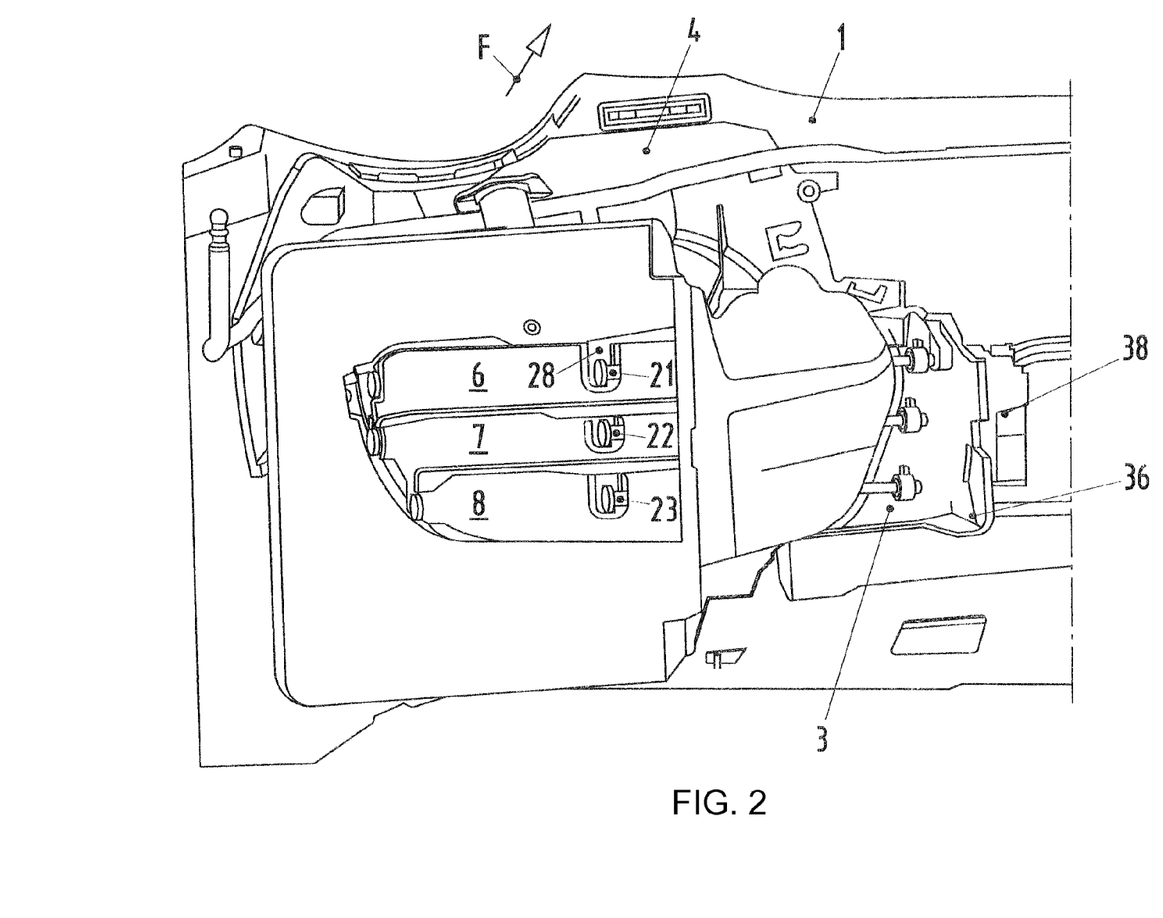
FIG. 2 is a diagrammatic, elevational view of the mounting device in accordance with FIG. 1 with an additional inner air guide element.

Referring now to the figures of the drawing in detail and first, particularly, to FIGS. 1 and 2 thereof, there is shown a mounting device for a cooling air flap module 2, which is held in a mounting frame 3, is arranged in a front panel 1 of a motor vehicle. A reinforcing frame 4, which can be fixed on the inside of the front panel 1, is connected to the mounting frame 3 on a front side. The front panel 1 preferably contains a large-area component made of plastic, which has at least two air inlet openings 5 (see FIG. 5) situated laterally at the outside, which are each reinforced by the reinforcing frames 4.

Figure 7:
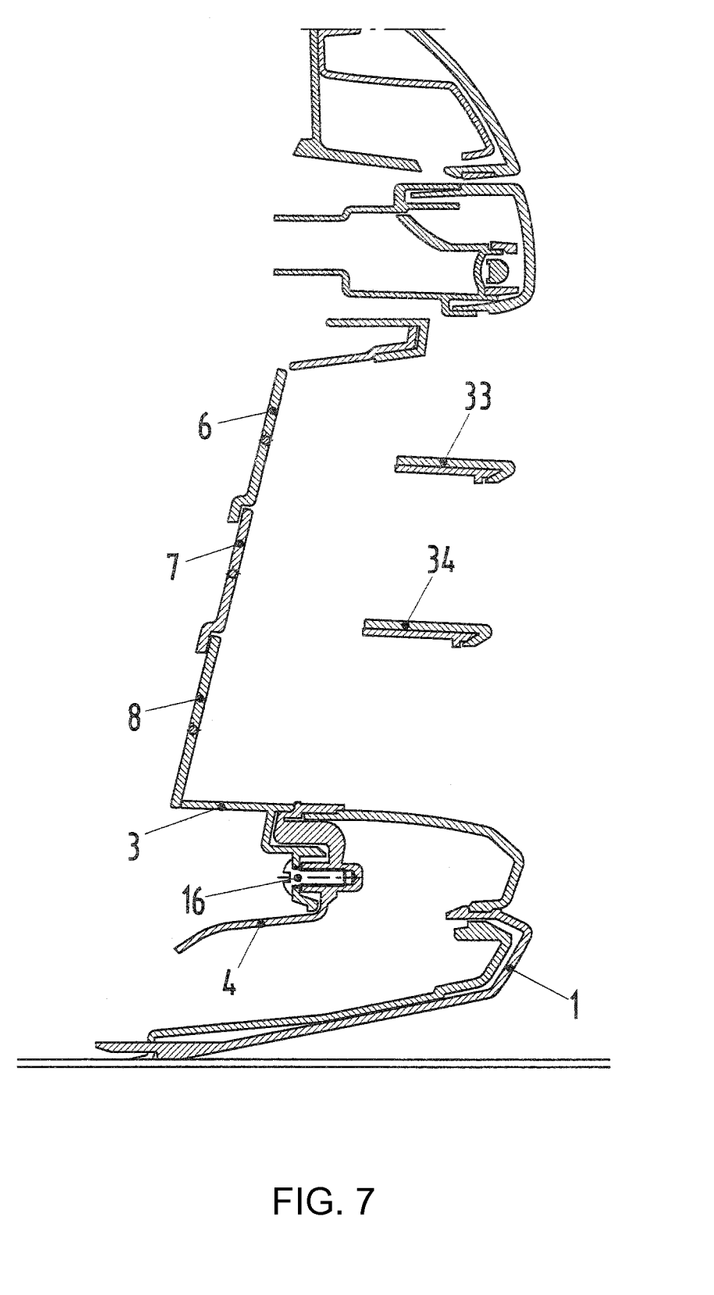
FIGS. 7 and 8 are diagrammatic, vertical sectional views through the mounting device with the cooling air flaps closed, with a screwed joint and a latching joint on the front panel.
Figure 8:
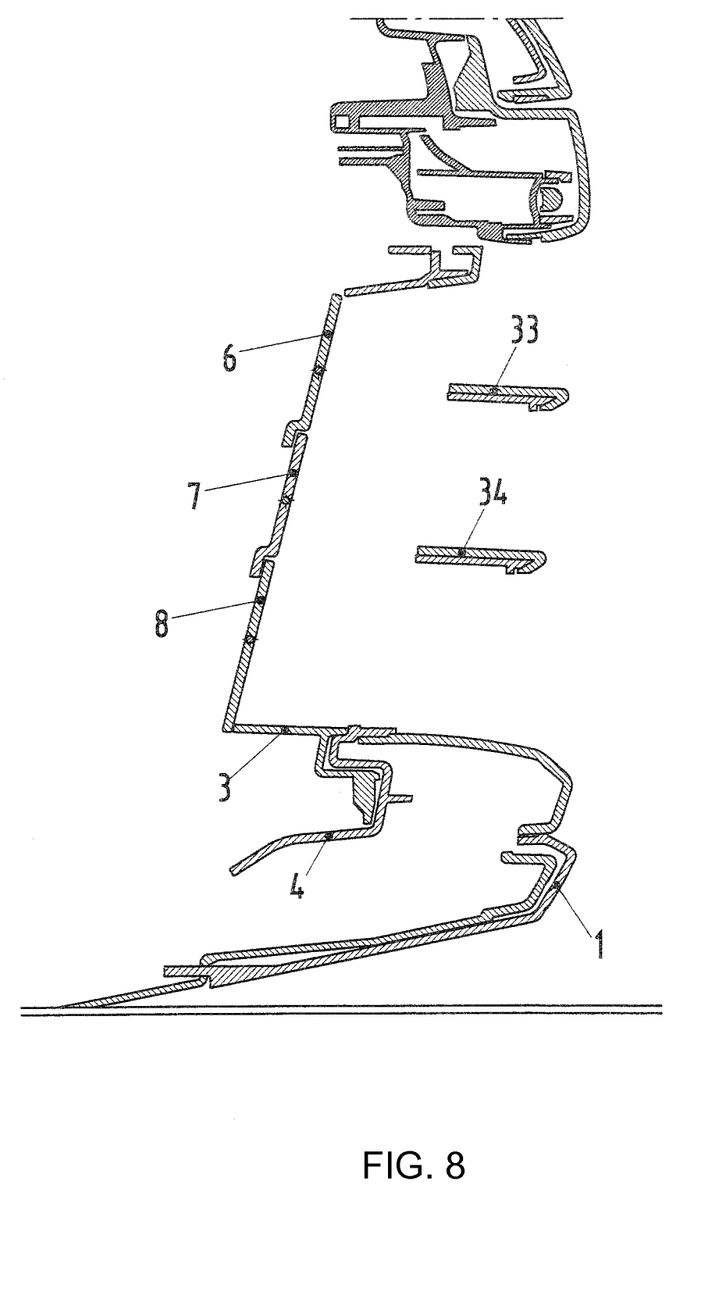

The mounting frame 3 is placed on the reinforcing frame 4 from the rear with respect to a direction of driving F, and connected at the top, at the bottom and at the sides by a plurality of screwed joints 16 (see FIG. 7), the reinforcing frame 4 preferably being capable of being fixed on the front panel 1 by screwed and/or snap-in joints.

Figure 3:
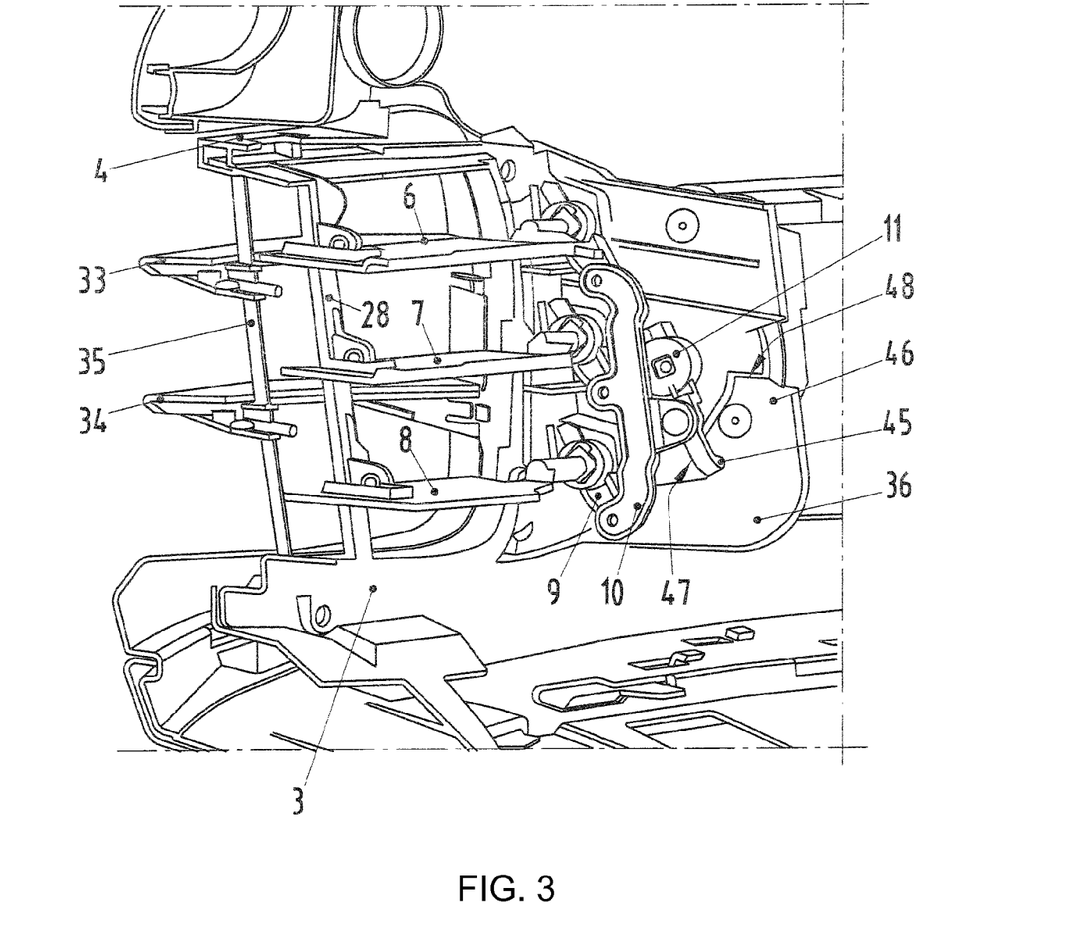
FIG. 3 is a diagrammatic, perspective view of one half of the cooling air flap module with the reinforcing frame positioned in front.
Figure 5:
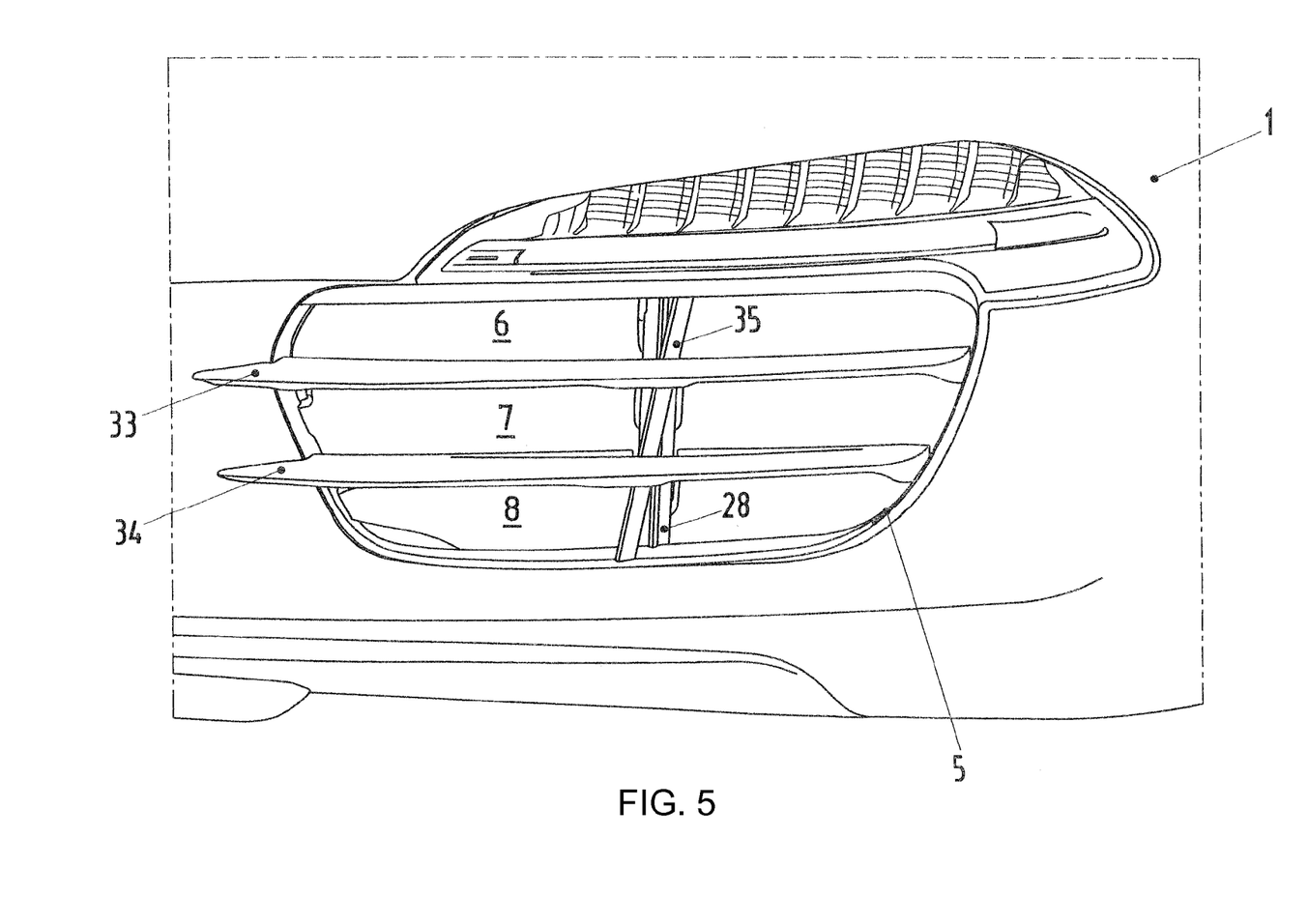
FIG. 5 is a diagrammatic perspective view of an air opening in the front panel with the cooling air flaps closed.
Figure 6:
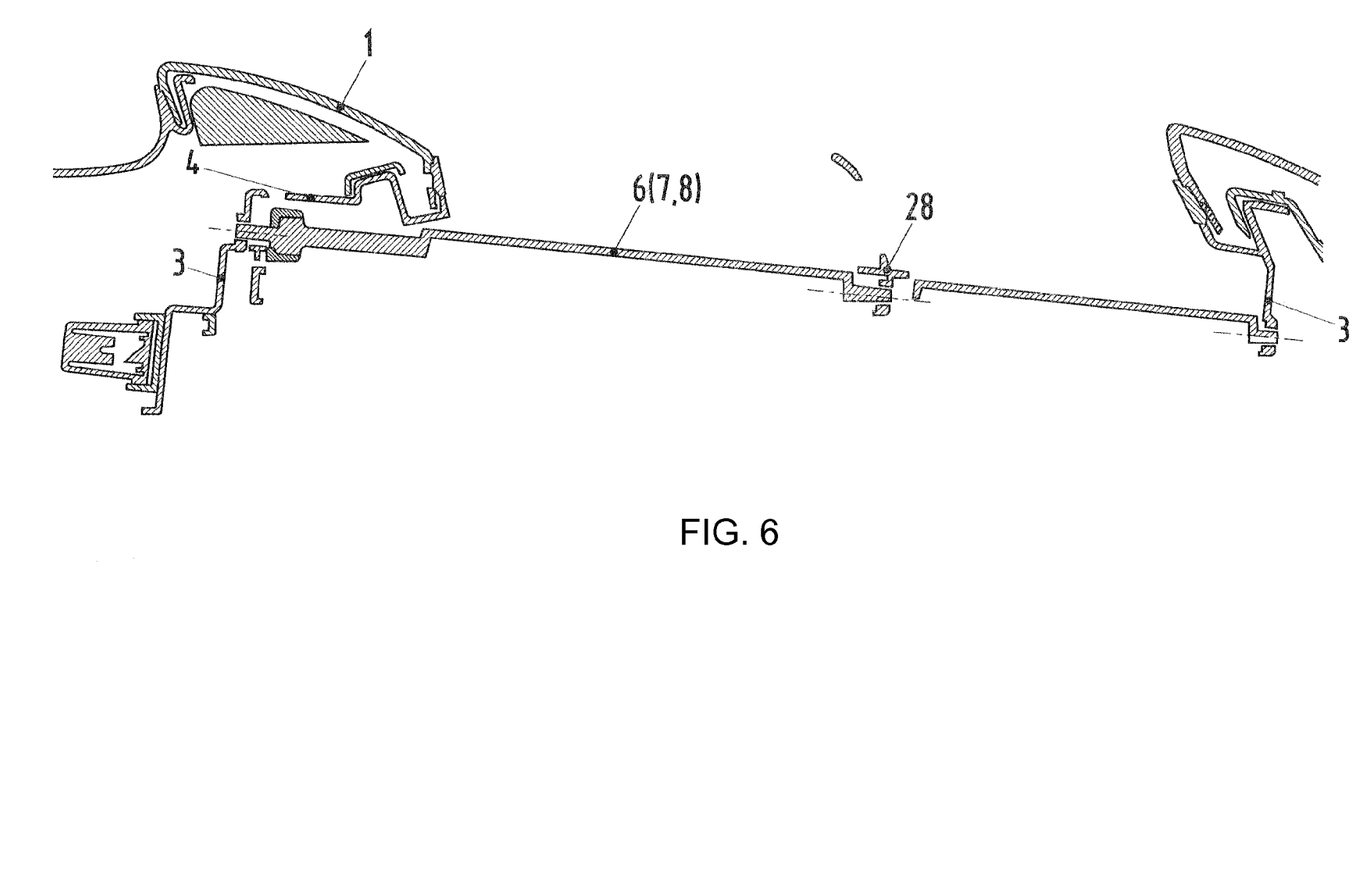
FIG. 6 is a diagrammatic, horizontal sectional view through an axis of rotation of the cooling air flap.

To control the air flow through the two lateral air inlet openings 5 in the front panel 1 to radiators situated behind, three pivotable cooling air flaps 6, 7 and 8 situated one above the other are in each case arranged in the region of these air inlet openings 5, the air flaps being adjustable into an open position, into a closed position and into various intermediate positions by an actuating motor 38 via common actuating elements 9, 10, 11 of an actuating device S (see FIG. 3).

Figure 9:
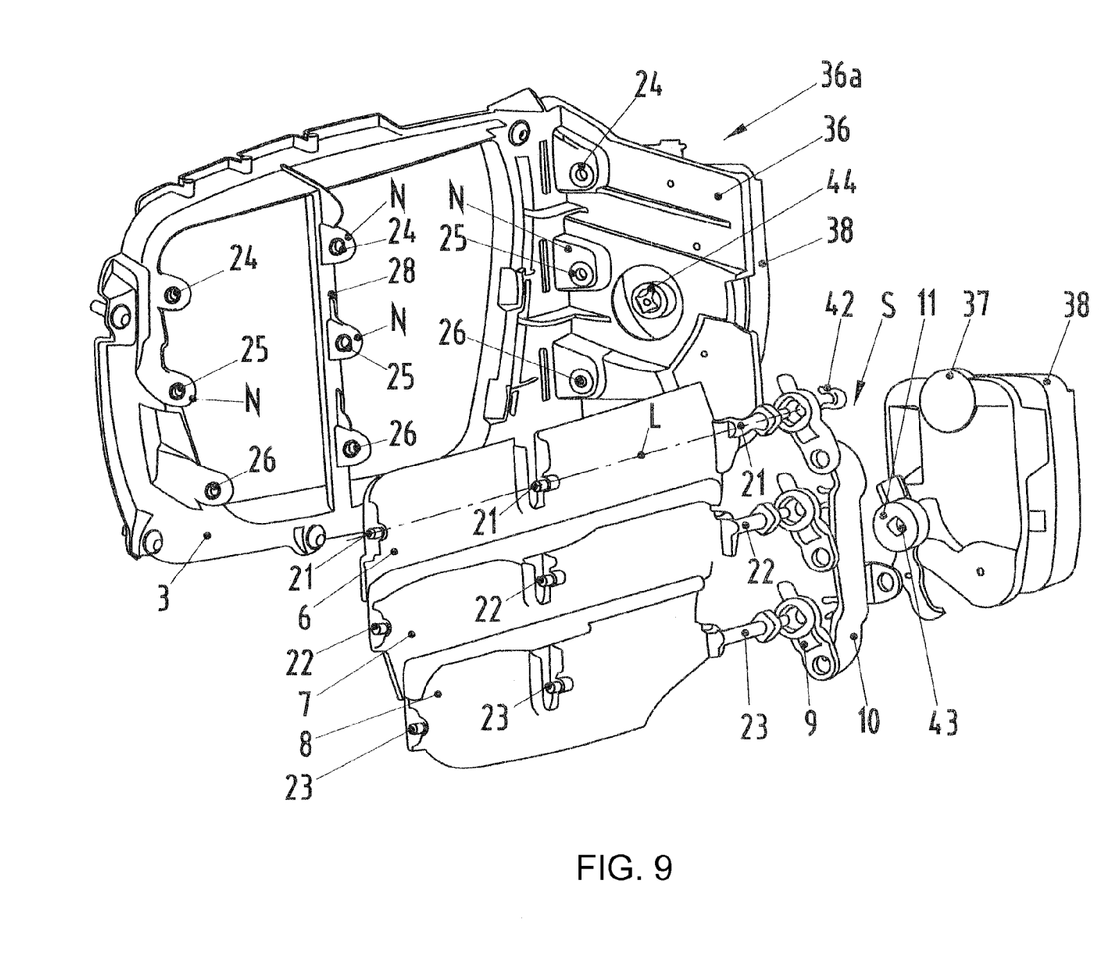
FIG. 9 is a diagrammatic perspective view of the mounting frame with the cooling air flaps and an actuating device with an actuating motor for the cooling air flaps.

The three pivotable cooling air flaps 6, 7 and 8 are each provided at the outer edge and centrally with bearing journals 21, 22, 23, which engage in bearings 24, 25 and 26 consisting of holes in the mounting frame 3 (see FIG. 9). The bearing journals 21, 22 and 23 and the bearings 24, 25, 26 of a cooling air flap are in each case arranged coaxially. The three bearing journals of a cooling air flap 6, 7, 8 and the associated bearing holes 24, 25, 26 in the mounting frame 3 are each provided with just one single reference number in the figures.

The mounting frame 3 has a vertical support 28 for the central bearing holes, from which support there extend inward-projecting lugs N, in which the bearing holes 24, 25 and 26 are arranged. Corresponding projecting lugs N for the bearing holes 24, 25 and 26 are also formed on the lateral edges of the mounting frame 3.

The three bearing journals 21, 22 and 23 of the cooling air flap 6, 7 and 8 are each preferably arranged in a horizontal longitudinal center plane L. However, it is also possible for them to be arranged at the upper edge of the cooling air flaps.

Figure 4:
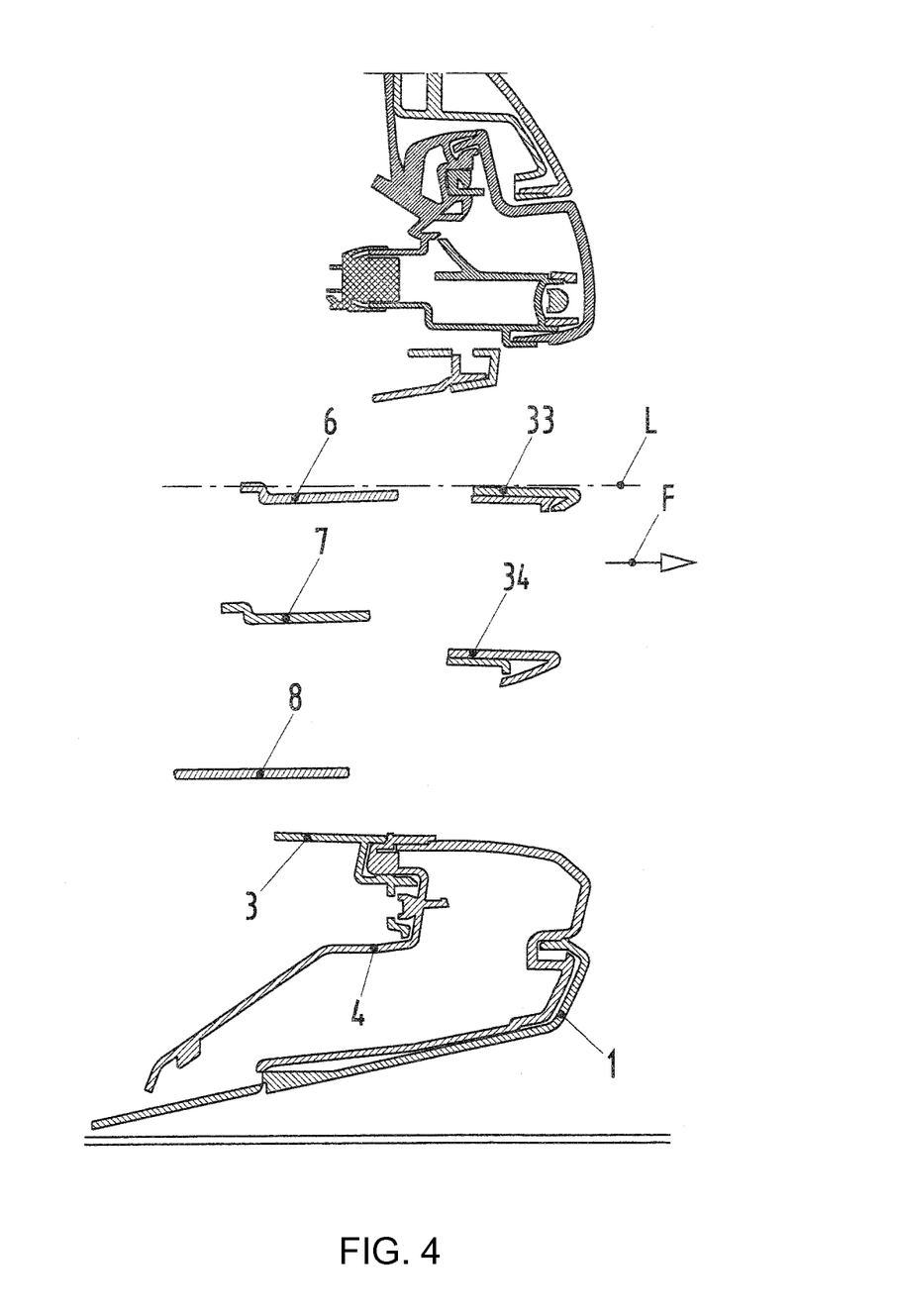
FIG. 4 is a diagrammatic, vertical sectional view through the mounting device in accordance with FIG. 3 in a region of a central division.

FIG. 3 shows that the reinforcing frame 4 has at least two fixed laminar transverse ribs 33 and 34 situated one above the other, which are positioned in front of the three cooling air flaps 6, 7 and 8 in the air inlet openings 5 of the front panel 1 and are held centrally with respect to the reinforcing frame 4 by an approximately vertical support 35. The transverse ribs 33 and 34 are arranged in alignment with the cooling air flaps 6, 7 and 8 in such a way that, in the open position of the cooling air flaps 6, 7 and 8, a horizontal air guide surface F is obtained together with the transverse ribs 33 and 34, this being illustrated in greater detail in FIG. 4.

At its edge 36a, the mounting frame 3 for the cooling air flap module 2 has a side wall 36, which is preferably offset at a right angle from the frame 3 and on the outside of which a mounting 37 for an actuating motor 38 is fixed by riveting and on the inside of which the actuating elements 9, 10 and 11 of the actuating device S are arranged. In one possible version of the illustrative embodiment, it would also be possible for the actuating motor 38 to be arranged on the inside of the side wall 36 and for the actuating device S to be arranged on the outside of the side wall.

The actuating device S contains actuating elements 9, which are each connected to a respective lateral bearing journal 21, 22, 23 of the cooling air flaps 6, 7 and 8 and are connected pivotably at the free end to a common connecting lever 10 in such a way that there is a synchronous motion of the three actuating elements 9 and thus also of the cooling air flaps 6, 7 and 8 by virtue of the connecting lever 10. A drive lever 11 is pivotably connected to the connecting lever 10, the drive lever in turn being drive-connected to the actuating motor 38.

Figure 10:
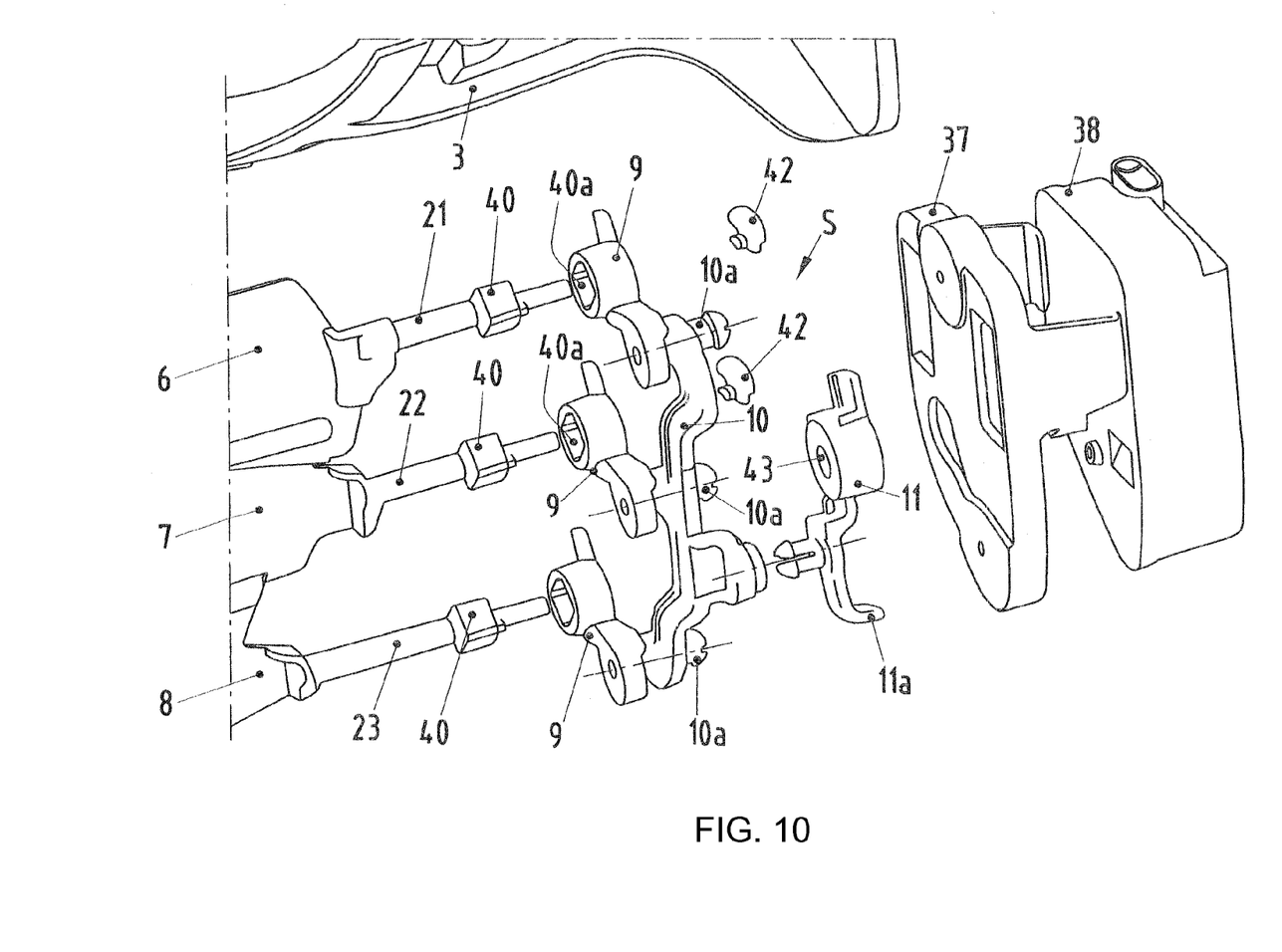
FIG. 10 is an enlarged, perspective view of the actuating device for the cooling air flaps.

The actuating elements 9 are connected to the bearing journals 21, 22, 23 of the cooling air flaps 6, 7 and 8 by a square profile 40 (see FIG. 10), which can be inserted into a square opening 41 corresponding thereto in the actuating element 9 so that the two components interact. Retention is provided by a retaining clip 42, which fixes the actuating element 9 in the axial direction. The connecting lever 10 is snapped onto the drive lever 11, which is, in turn, connected to a projecting square profile 44 on a drive shaft of the actuating motor 38 by a square opening 43.

When the drive lever 4 is pivoted by the actuating motor 38, the connecting lever 10 is adjusted and pivots the three actuating levers 9 and hence also the cooling air flaps 6, 7 and 8 in synchronism into an open position, a closed position or into intermediate positions.

At its free end, the drive lever 11 has an angled offset 45, which is arranged in a recess 46 in the offset side wall 36 of the mounting frame 3, and this recess 46 has a lower stop 47 for the offset 45 of the drive lever 11 in the open position of the cooling air flaps 6, 7 and 8 and an upper stop 48 in the closed position of the cooling air flaps 6, 7 and 8 (see FIG. 3).

The invention claimed is:

1. A mounting module for a front panel of a motor vehicle, the front panel having an air feed opening formed therein, the mounting module comprising: a forward-mounted reinforcing frame; and a cooling air flap module having a closed mounting frame with opposite lateral webs, lateral bearings at each of the opposite lateral webs, cooling air flaps having opposite ends pivotally connected to the lateral bearings at the opposite lateral webs of said closed mounting frame, and an actuating device mounted adjacent one of the lateral webs and having actuating elements for pivoting said cooling air flaps, said closed mounting frame being fixed in said forward-mounted reinforcing frame, said closed mounting frame with said forward-mounted reinforcing frame being connected as a constructional unit to the front panel so as to form a module.

2. The mounting module according to claim 1, wherein: each of said cooling air flaps has end bearing journals at the opposite ends thereof and a center bearing journals at a position between the ends; and said closed mounting frame has a vertical support in a center region between the opposite lateral webs, the vertical support having center bearing holes formed therein and pivotally engaging said center bearings journals of the cooling air flaps, and said the lateral bearings of the lateral webs are lateral bearings holes for pivotally holding said end bearing journals of said cooling air flaps.

3. The mounting module according to claim 2, wherein said end and center bearing journals of said cooling air flaps are arranged in a horizontal longitudinal center plane, and said bearing journals can be inserted into respective ones of said center and lateral bearing holes in said closed mounting frame.

4. The mounting module according to claim 1, wherein said closed mounting frame has inward-projecting lugs on the lateral webs and said lateral bearings are formed in said inward-projecting lugs.

5. The mounting module according to claim 1, further comprising laminar transverse ribs, and in an open position for allowing air to flow through, said cooling air flaps are disposed as in-line extensions of said laminar transverse ribs disposed one above another in a fixed manner on said forward-mounted reinforcing frame.

6. The mounting module according to claim 5, wherein said forward-mounted reinforcing frame has a vertical central support and said laminar transverse ribs are supported by said vertical central support.

7. The mounting module according to claim 1, further comprising a plurality of screwed joints; and wherein said closed mounting frame is placed on said forward-mounted reinforcing frame from a rear with respect to a direction of driving, and is connected at a top, at a bottom and at sides by said plurality of screwed joints, and said forward-mounted reinforcing frame is capable of being fixed on the front panel by at least one of said screwed joints and snap-in joints.

8. A mounting module for a front panel of a motor vehicle, the front panel having an air feed opening formed therein, the mounting module comprising: a forward-mounted reinforcing frame; and a cooling air flap module having a closed mounting frame with opposite lateral webs, lateral bearing holes at each of the opposite lateral webs, a vertical support in a center region of the closed mounting frame between the opposite lateral webs, the vertical support having center bearing holes formed therein; cooling air flaps, each of the cooling air flaps having opposite end bearing journals pivotally connected to the lateral bearing holes at each of the opposite lateral webs and a center bearing journal pivotally connected to one of the center bearing holes of the vertical support, an actuating device having actuating elements for actuating the cooling air flaps, an actuating motor and a motor mounting; and wherein said closed mounting frame of said cooling air flap module has at one edge an offset side wall, and on an inside of said offset side wall said actuating elements of said actuating device for actuating said cooling air flaps are disposed and supported and on an outside of said offset side wall said actuating motor is held in said motor mounting, the closed mounting frame being fixed in the forward-mounted reinforcing frame, and the closed mounting frame with the forward-mounted reinforcing frame being connected as a constructional unit to the front panel so as to form a module.

9. The mounting module according to claim 8, further comprising a common connecting lever; snap-in studs; and a drive lever; said actuating elements of said actuating device are each connected to said bearing journals of said cooling air flaps and are pivoted on said common connecting lever by said snap-in studs, and said connecting lever interacting with said drive lever is drive-connected to said actuating motor.

10. The mounting module according to claim 2, wherein: said actuating elements are actuating levers each having a square profile; and said bearing journals that face said actuating levers of said actuating device each have at their end a square profile that can in each case be inserted into a corresponding said square profile of said actuating levers for said cooling air flaps.

11. The mounting module according to claim 9, wherein: said offset side wall has a recess formed therein; and said drive lever has a free end with an angled offset, said angle offset is disposed in said recess in said offset side wall of said closed mounting frame, and said recess forms a stop for an open end position and a further stop for a closed end position of said cooling air flaps.

12. The mounting module according to claim 9, wherein said connecting lever is disposed in approximately vertical alignment and is connected to said actuating elements of said cooling air flaps, said cooling air flaps being movable synchronously into an open position, a closed position and intermediate positions.

13. The mounting module according to claim 9, wherein: said actuating motor has a drive shaft with a projecting square profile; and said drive lever has an end with a square opening formed therein and can be mounted at said end on said projecting square profile on said drive shaft of said actuating motor.

* * * * *